(12) United States Patent
Ko et al.

(10) Patent No.: US 12,149,282 B2
(45) Date of Patent: Nov. 19, 2024

(54) APPARATUS BASED ON WIRELESS OPTICAL COMMUNICATION

(71) Applicant: Korea University Research and Business Foundation, Seoul (KR)

(72) Inventors: Young-Chai Ko, Seoul (KR); Jong-Min Kim, Seoul (KR); Ju-Hyung Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 112 days.

(21) Appl. No.: 17/893,434

(22) Filed: Aug. 23, 2022

(65) Prior Publication Data
US 2023/0083544 A1  Mar. 16, 2023

(30) Foreign Application Priority Data
Aug. 25, 2021 (KR) .................. 10-2021-0112046

(51) Int. Cl.
*H04B 10/11*     (2013.01)
*H04B 10/071*    (2013.01)

(52) U.S. Cl.
CPC .......... *H04B 10/071* (2013.01); *H04B 10/11* (2013.01)

(58) Field of Classification Search
None
See application file for complete search history.

(56) References Cited

U.S. PATENT DOCUMENTS

| | | | |
|---|---|---|---|
| 6,535,314 B1 * | 3/2003 | Mendenhall | H04B 10/118 398/121 |
| 7,983,565 B2 * | 7/2011 | Varshneya | G01S 17/86 398/189 |
| 9,060,346 B1 | 6/2015 | Shcheglov et al. | |
| 9,088,367 B2 * | 7/2015 | Hulsey | H04B 10/1125 |

(Continued)

FOREIGN PATENT DOCUMENTS

| | | |
|---|---|---|
| JP | 2000-244408 A | 9/2000 |
| KR | 10-1960699 | 3/2019 |

(Continued)

OTHER PUBLICATIONS

Mathcentre, Polar co-ordinates, 2009 (Year: 2009).*

(Continued)

*Primary Examiner* — Jai M Lee
(74) *Attorney, Agent, or Firm* — NSIP Law

(57) ABSTRACT

Disclosed is an apparatus based on wireless optical communication, which may include: a light source outputting light; an optical circulator outputting the light in at least one direction; a collimator converting and outputting the light output through the optical circulator into a parallel beam; an optical regulator reflecting the light converted into the parallel beam, and transferring the reflected light to an external apparatus, and receiving the reflected light from the external apparatus, the reflected light being light output by reversely reflecting the light by the external apparatus; an optical detector converting the reflected light into an electric signal to generate an optical signal; and a controller analyzing the optical signal and acquiring an intensity of the reflected light, and calculating central coordinate information of the external apparatus based on the intensity value of the reflected light.

8 Claims, 11 Drawing Sheets

(56) References Cited

U.S. PATENT DOCUMENTS

| | | | | |
|---|---|---|---|---|
| 10,069,562 | B2* | 9/2018 | Wang | H04J 14/0227 |
| 10,439,716 | B2* | 10/2019 | Miller | H04B 10/1123 |
| 10,892,825 | B2* | 1/2021 | Kim | H02J 50/30 |
| 11,255,972 | B2* | 2/2022 | Kalscheur | G01S 17/42 |
| 11,476,933 | B1* | 10/2022 | Mitchell | H04B 10/1123 |
| 11,493,703 | B2* | 11/2022 | Cheng | H01S 3/2316 |
| 11,656,344 | B2* | 5/2023 | Hoffer, Jr. | G01B 11/002 |
| | | | | 356/4.01 |
| 11,736,188 | B2* | 8/2023 | Nykolak | H04B 10/118 |
| | | | | 398/118 |
| 11,859,976 | B2* | 1/2024 | Walser | G01S 7/4816 |
| 11,914,075 | B2* | 2/2024 | Takagawa | G02B 26/101 |
| 11,941,982 | B2* | 3/2024 | Niizuma | B60L 53/14 |
| 11,949,449 | B2* | 4/2024 | Fujita | H04B 10/11 |
| 2006/0018661 | A1* | 1/2006 | Green | H04B 10/1127 |
| | | | | 398/128 |
| 2010/0158536 | A1 | 6/2010 | Vaillon et al. | |
| 2014/0079404 | A1* | 3/2014 | Kykta | H04B 10/1129 |
| | | | | 398/128 |
| 2014/0241731 | A1* | 8/2014 | Peach | H04B 10/11 |
| | | | | 398/139 |
| 2019/0154835 | A1* | 5/2019 | Maleki | G01S 17/931 |
| 2021/0250092 | A1* | 8/2021 | Dickson | H04B 10/077 |
| 2021/0302631 | A1* | 9/2021 | Chou | G02B 27/14 |
| 2022/0345221 | A1* | 10/2022 | Mitchell | H04B 10/1121 |
| 2023/0006739 | A1* | 1/2023 | Iranzad | H04B 10/1125 |

FOREIGN PATENT DOCUMENTS

| | | |
|---|---|---|
| KR | 10-2073655 | 2/2020 |
| KR | 10-2247745 | 5/2021 |

OTHER PUBLICATIONS

Korean Office Action Issued on Oct. 27, 2022, in counterpart Korean Patent Application No. 10-2021-0112046 (4 Pages in Korean).

* cited by examiner

[FIG. 1]
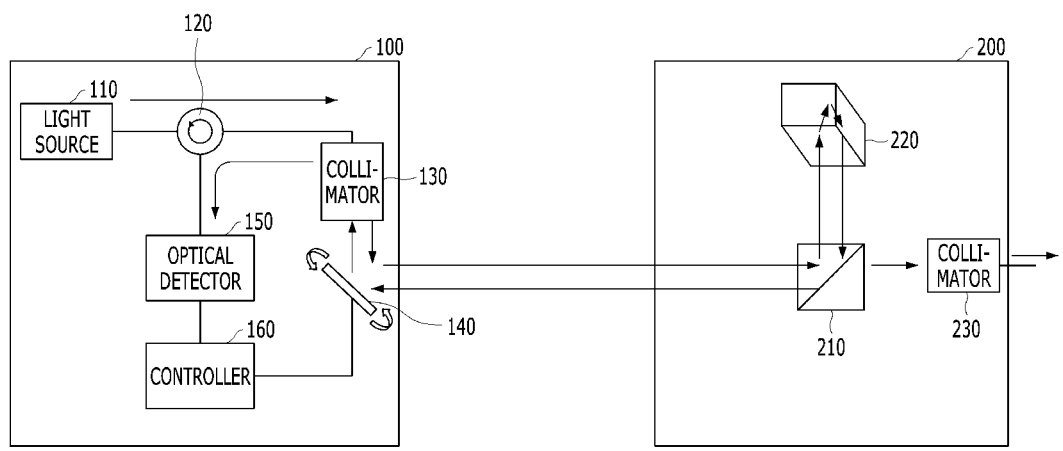

[FIG. 2]
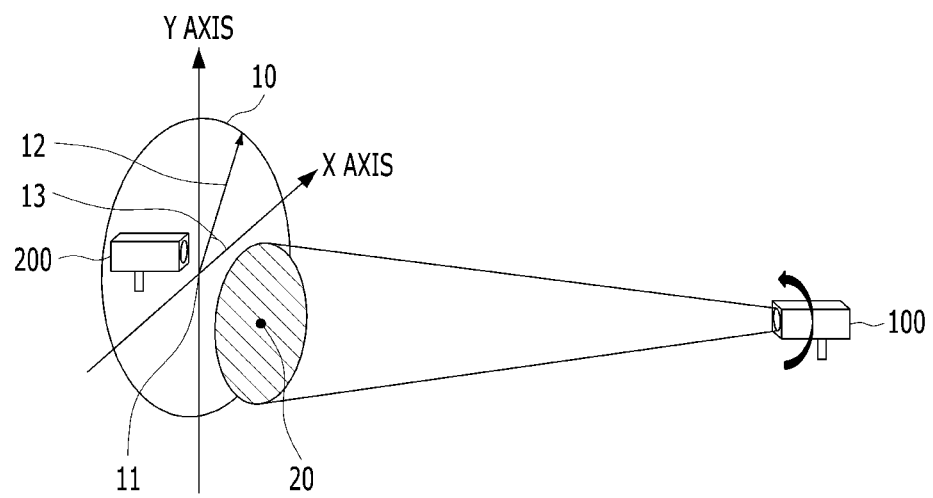

[FIG. 3]
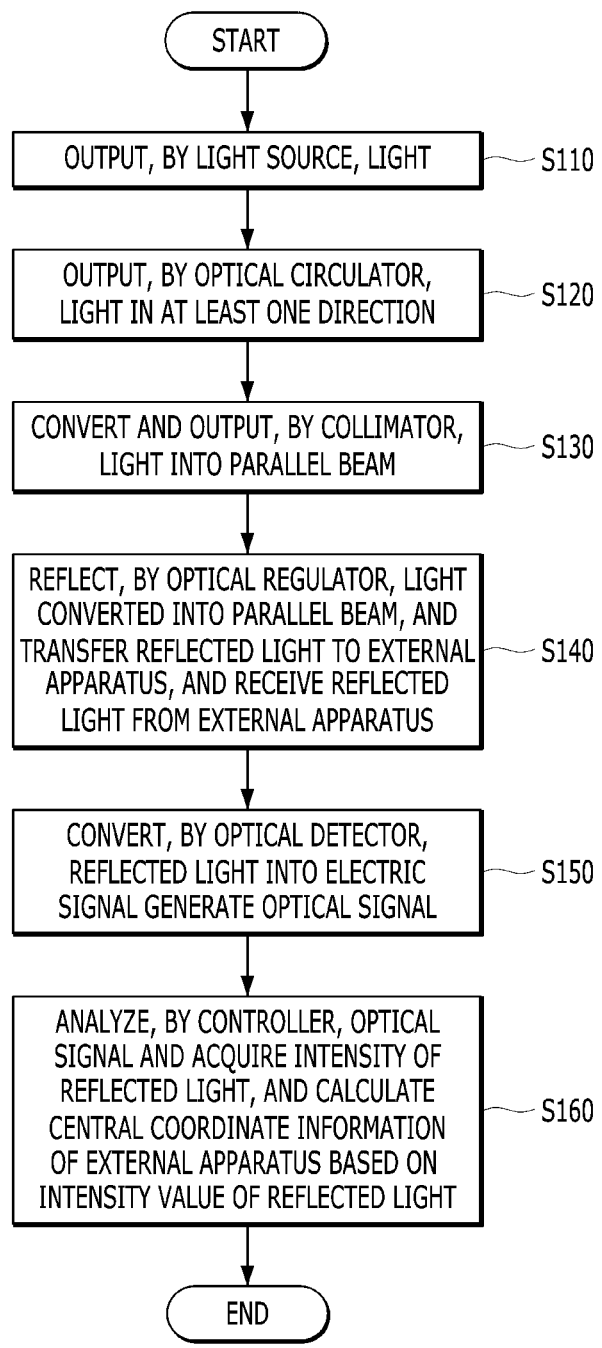

[FIG. 4]
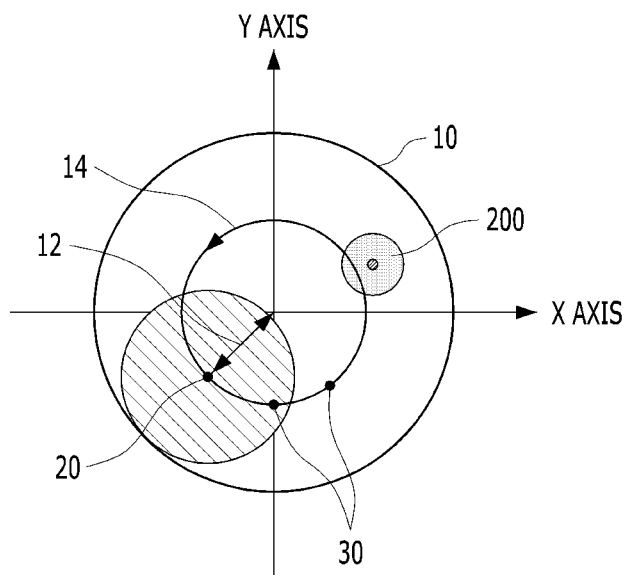

[FIG. 5]
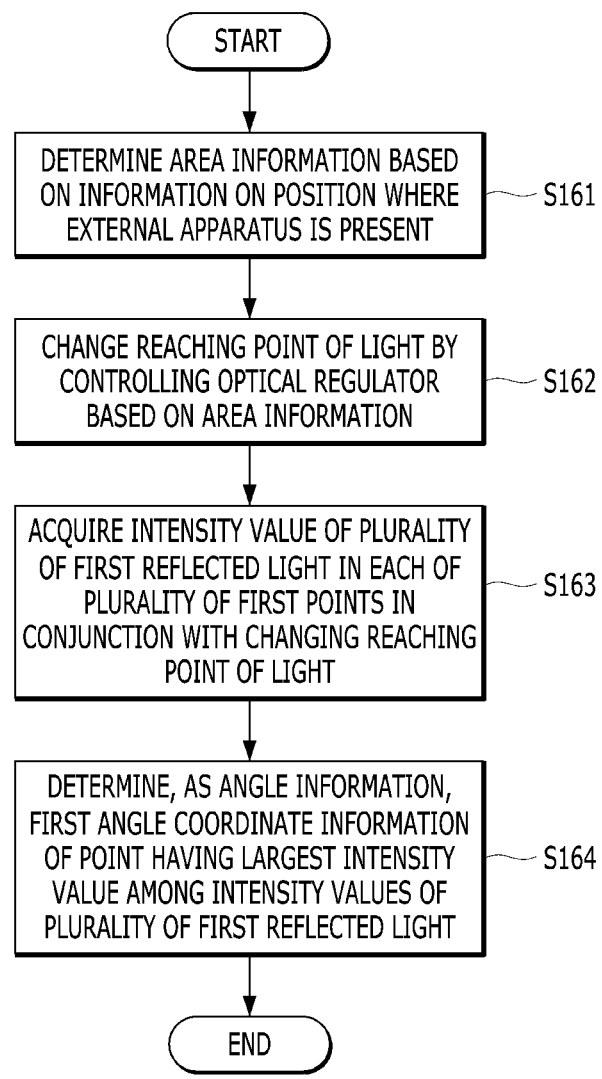

[FIG. 6]
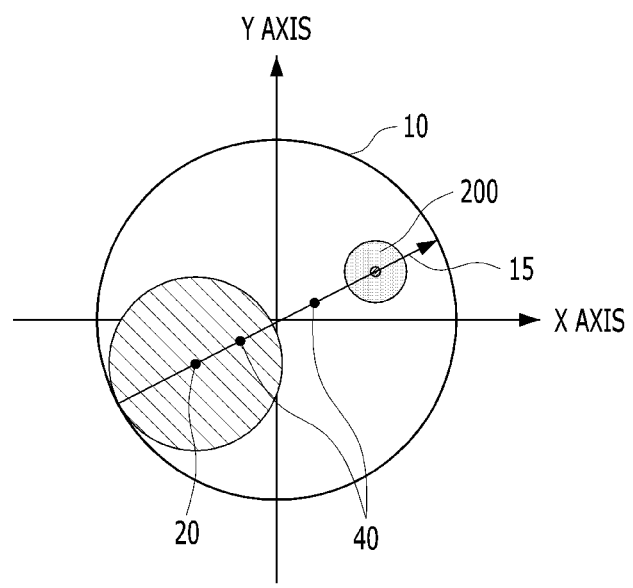

[FIG. 7]
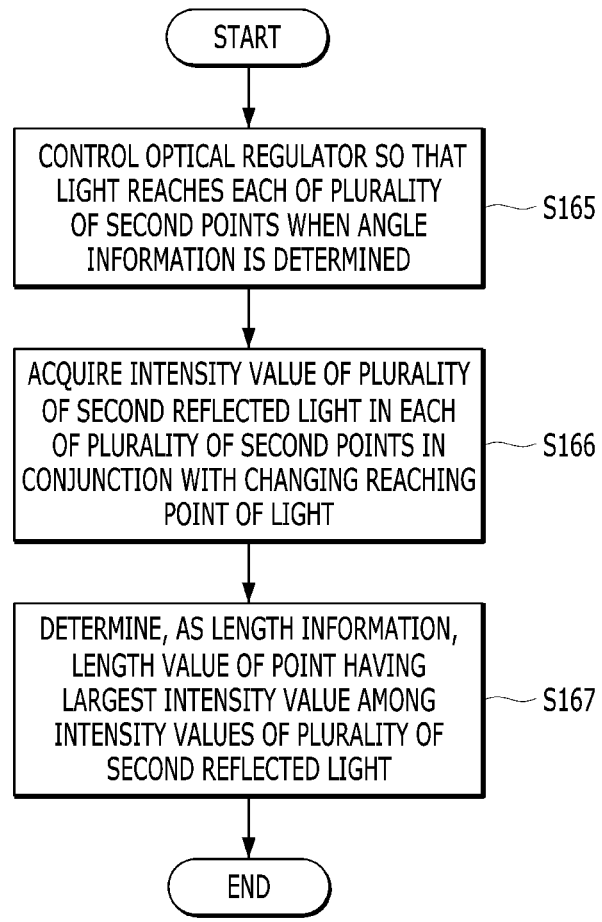

[FIG. 8]
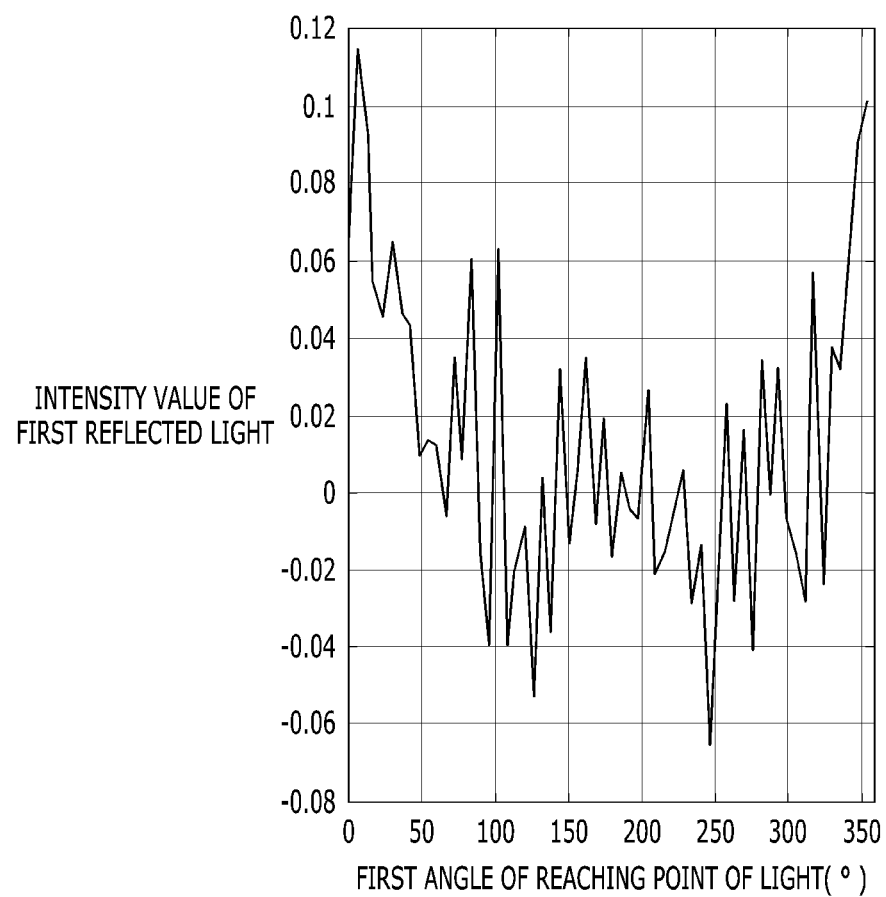

[FIG. 9]
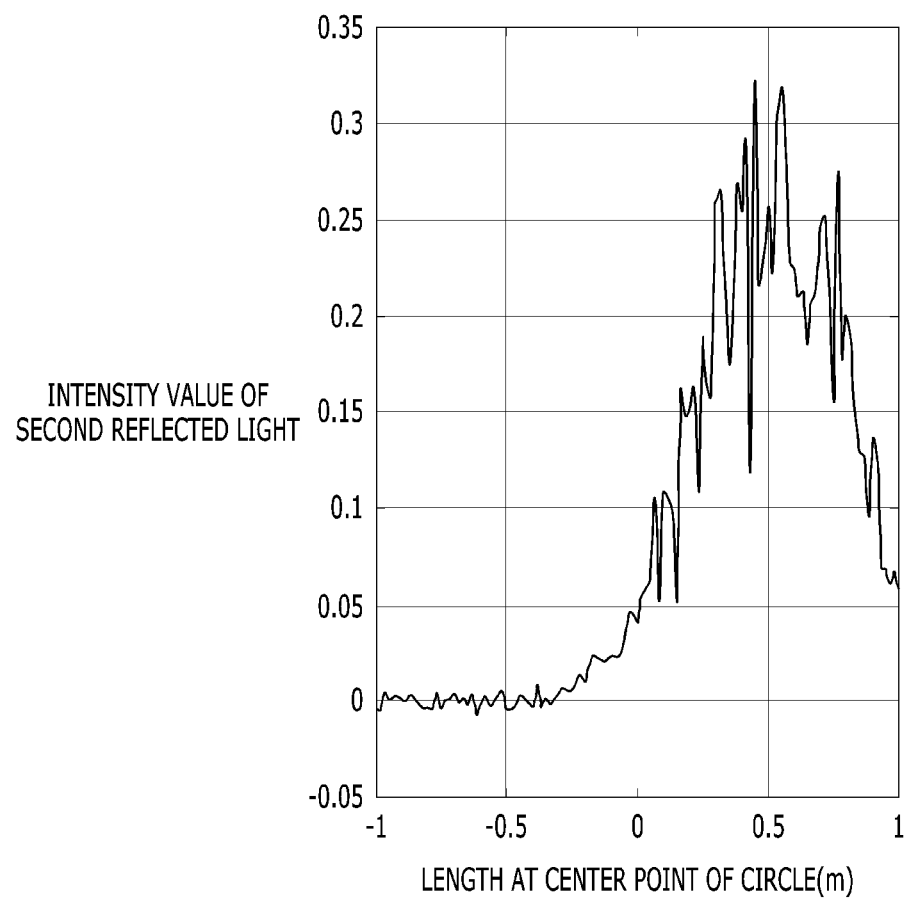

[FIG. 10]
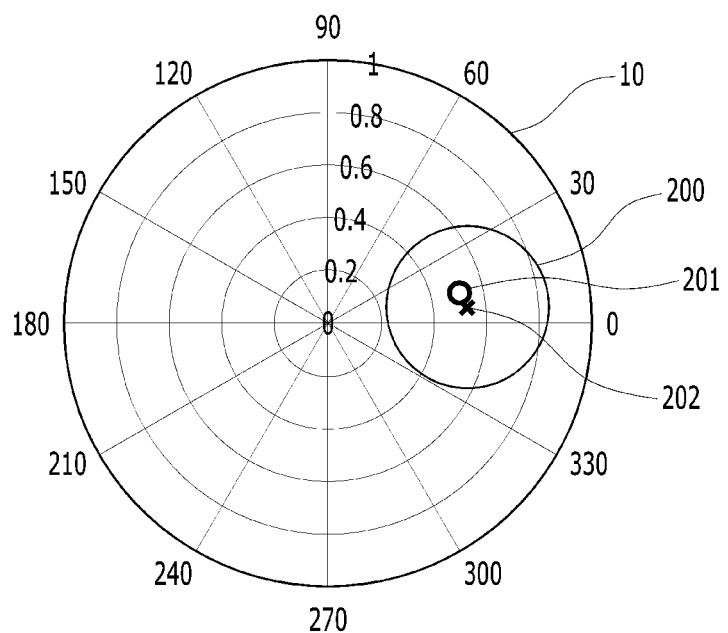

[FIG. 11]
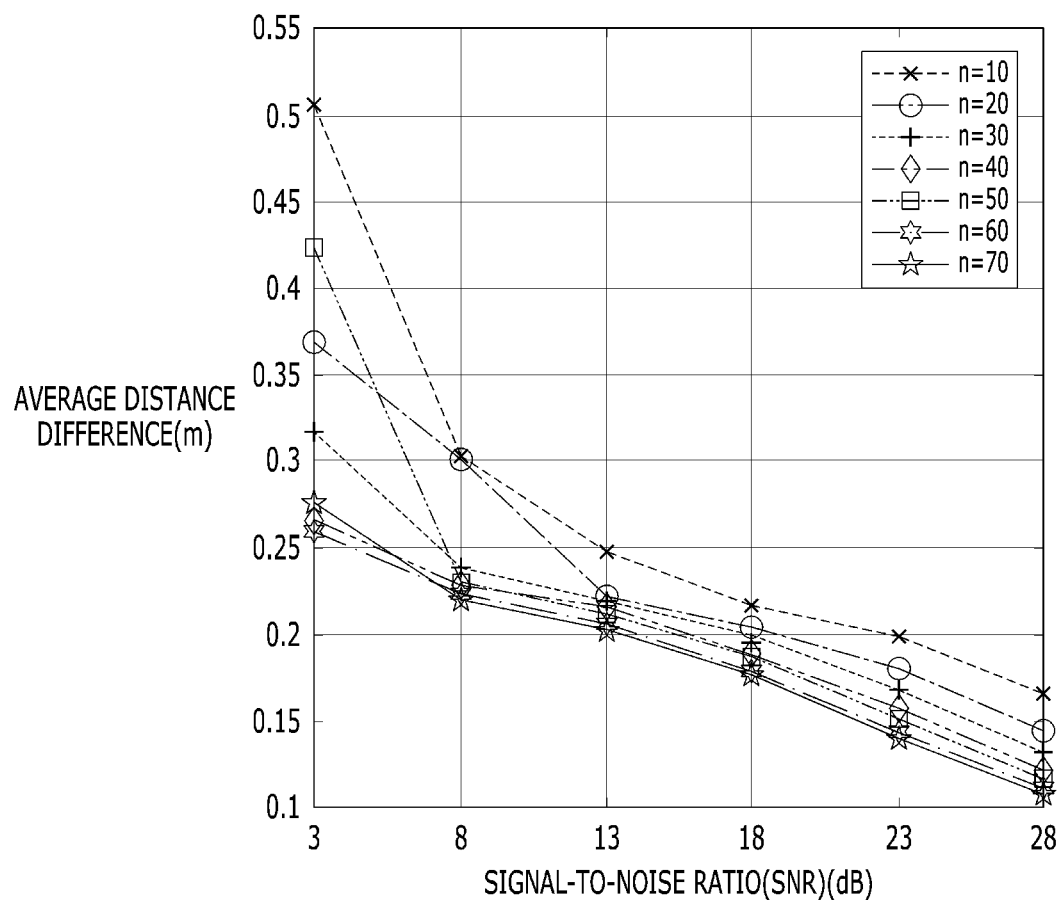

APPARATUS BASED ON WIRELESS OPTICAL COMMUNICATION

CROSS-REFERENCE TO RELATED APPLICATIONS

This application claims priority to and the benefit of Korean Patent Application No. 10-2021-0112046 filed in the Korean Intellectual Property Office on Aug. 25, 2021, the entire contents of which are incorporated herein by reference.

TECHNICAL FIELD

The present disclosure relates to an apparatus based on wireless optical communication, and more particularly, to an apparatus and a method based on wireless optical communication for aligning a beam.

BACKGROUND ART

Unlike the existing radio frequency (RF) communication, the wireless optical communication technology is a technology that does not have a frequency usage right problem and guarantees a high-speed communication speed, safety, and security which are advantages of optical communication. When wireless optical communication is used in long-distance non-ground communications, a high signal-to-ratio (SNR) can be obtained even with small transmission power.

The wireless optical communication technology has a problem in that since a width of a beam is narrow, if a transmitter and a receiver are not aligned, the beam is not aligned, and as a result, the optical communication is not smoothly made.

According to the wireless optical communication technology has a need for developing an apparatus and a method for aligning the beam by aligning the transmitter and receiver.

SUMMARY OF THE INVENTION

The present disclosure has been made in an effort to provide an apparatus and a method based on wireless optical communication for aligning a beam.

However, technical objects of the present disclosure are not restricted to the technical object mentioned as above. Other unmentioned technical objects will be apparently appreciated by those skilled in the art by referencing to the following description.

An exemplary embodiment of the present disclosure provides an apparatus based on wireless optical communication, which may include: a light source outputting light; an optical circulator outputting the light in at least one direction; a collimator converting and outputting the light output through the optical circulator into a parallel beam; an optical regulator reflecting the light converted into the parallel beam, and transferring the reflected light to an external apparatus, and receiving the reflected light from the external apparatus, the reflected light being light output by reversely reflecting the light by the external apparatus; an optical detector converting the reflected light into an electric signal to generate an optical signal; and a controller analyzing the optical signal and acquiring an intensity of the reflected light, and calculating central coordinate information of the external apparatus based on the intensity value of the reflected light.

Alternatively, the central coordinate information may be expressed as a pole coordinate including length information and angle information.

Alternatively, the controller may determine the length information and the angle information included in the central coordinate information based on intensity values of a plurality of reflected light acquired by changing a reaching point of the light by controlling the optical regulator.

Alternatively, the controller may determine area information based on information on a position where the external apparatus is present, change the reaching point of the light by controlling the optical regulator based on the area information, acquire intensity values of a plurality of first reflected light in each of a plurality of first points in conjunction with changing the reaching point of the light, and determine, as the angle information, first angle coordinate information of a point having a largest intensity value among the intensity values of the plurality of first reflected light.

Alternatively, the area information may include at least one of central point information and preliminary length information, for determining the reaching point of the light.

Alternatively, each of the plurality of first points may be present on a trajectory of a circle generated based on the central point information and the preliminary length information.

Alternatively, the central point information may include information on the center point of the circle, and the preliminary length information may include information on a radius of the circle.

Alternatively, the controller may control the optical regulator so that the light reaches each of a plurality of second points when the angle information is determined, acquire intensity values of a plurality of second reflected light in each of the plurality of second points in conjunction with changing the reaching point of the light, and determine, as the length information, a length value of a point having a largest intensity value among the intensity values of the plurality of second reflected light.

Alternatively, each of the plurality of second points may be present on a trajectory of a straight line generated based on the first angle coordinate information.

Alternatively, the external apparatus may include a beam separator reflecting the light and transferring the reflected light to the optical regulator, and a reverse reflector outputting the reflected light by reversely reflecting the light reflected by the beam separator.

Another exemplary embodiment of the present disclosure provides a method for aligning a beam using a wireless optical communication based apparatus, which may include: outputting, by a light source, light; outputting, by an optical circulator, the light in at least one direction; converting and outputting, by a collimator, the light output through the optical circulator into a parallel beam; reflecting, by an optical regulator, the light converted into the parallel beam, and transferring the reflected light to an external apparatus, and receiving the reflected light from the external apparatus, the reflected light being light output by reversely reflecting the light by the external apparatus; converting, by an optical detector, the reflected light into an electric signal to generate an optical signal; and analyzing, by a controller, the optical signal and acquiring an intensity of the reflected light, and calculating central coordinate information of the external apparatus based on the intensity value of the reflected light.

According to an exemplary embodiment of the present disclosure, a beam is aligned by calculating central coordinate information of an external apparatus to achieve smooth optical communication.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

FIG. 1 is a diagram for describing an example of an apparatus based on wireless optical communication and an external apparatus according to some exemplary embodiments of the present disclosure.

FIG. 2 is a diagram for describing an example of a method for aligning a beam using an apparatus based on wireless optical communication according to some exemplary embodiments of the present disclosure.

FIG. 3 is a flowchart for describing an example of the method for aligning a beam using the apparatus based on wireless optical communication according to some exemplary embodiments of the present disclosure.

FIG. 4 is a diagram for describing an example of a method for calculating angle information in central coordinate information of the external apparatus by using the apparatus based on wireless optical communication according to some exemplary embodiments of the present disclosure.

FIG. 5 is a flowchart for describing an example of the method for calculating angle information in central coordinate information of the external apparatus by using the apparatus based on wireless optical communication according to some exemplary embodiments of the present disclosure.

FIG. 6 is a diagram for describing an example of a method for calculating length information in central coordinate information of the external apparatus by using the apparatus based on wireless optical communication according to some exemplary embodiments of the present disclosure.

FIG. 7 is a flowchart for describing an example of the method for calculating length information in central coordinate information of the external apparatus by using the apparatus based on wireless optical communication according to some exemplary embodiments of the present disclosure.

FIG. 8 is a diagram illustrating an intensity value of first reflection light according to a first angle of a reaching point of light measured through the apparatus based on wireless optical communication according to some exemplary embodiments of the present disclosure.

FIG. 9 is a diagram illustrating an intensity value of second reflection light according to a length at a center point of a circle measured through the apparatus based on wireless optical communication according to some exemplary embodiments of the present disclosure.

FIG. 10 is a diagram illustrating a central coordinate of the external apparatus and an actual central coordinate of the external apparatus calculated through the apparatus based on wireless optical communication according to some exemplary embodiments of the present disclosure.

FIG. 11 is a diagram illustrating an average distance difference according to a signal-to-noise ratio measured for each value of white Gaussian noise through the apparatus based on wireless optical communication according to some exemplary embodiments of the present disclosure.

DETAILED DESCRIPTION

Various embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an exemplary embodiment disclosed in the present disclosure, a detailed description of related known technologies will be omitted if it is determined that the detailed description makes the gist of the exemplary embodiment of the present disclosure unclear. Further, the accompanying drawings are only for easily understanding the exemplary embodiment disclosed in this specification and the technical spirit disclosed by this specification is not limited by the accompanying drawings.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

It should be understood that, when it is described that a component is "connected to" or "accesses" another component, the component may be directly connected to or access the other component or a third component may be present therebetween. In contrast, it should be understood that, when it is described that a component is "directly connected to" or "directly access" another component, no component is present between the component and another component.

Suffixes "module" and "unit" for components used in the following description are given or mixed in consideration of easy preparation of the specification only and do not have their own distinguished meanings or roles.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or a usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

A wireless optical communication based apparatus according to some exemplary embodiments of the present disclosure may mean a wireless optical communication based apparatus which may calculate central coordinate information of an external apparatus and align a beam. However, the present disclosure is not limited thereto.

FIG. 1 is a diagram for describing an example of an apparatus based on wireless optical communication and an external apparatus according to some exemplary embodiments of the present disclosure. FIG. 2 is a diagram for describing an example of a method for aligning a beam using an apparatus based on wireless optical communication according to some exemplary embodiments of the present disclosure.

Referring to FIG. 1, the wireless optical communication based apparatus 100 may include a light source 110, an optical circulator 120, a collimator 130, an optical regulator 140, an optical detector 150, and a controller 160. In addition, the external apparatus 200 may include a beam separator 210, a reverse reflector 220, and a collimator 230.

However, components described above are not required in implementing the wireless optical communication based apparatus 100 or the external apparatus 200, so the wireless optical communication based apparatus 100 and the external apparatus 200 may have components more or less than components listed above.

First, when the wireless optical communication based apparatus 100 is described, the light source 110 may output light. Specifically, the light source 110 may output light having a wavelength band of a predetermined range. For example, the lights source 110 may output light having an infrared wavelength band. In addition, the light source 110 may output light so that the intensity of the light has a predetermined distribution. In addition, the light source 110 may output light in which the intensity of the light has a Gaussian distribution. Meanwhile, the light source 110 may include at least one laser for outputting the light, but is not limited thereto.

The optical circulator 120 may output the light output by the light source 110 in at least one direction. For example, the optical circulator 120 may receive the light output by the light source 110 and internally reflect the received light, and output the reflected light in a direction corresponding to the collimator 130.

The collimator 130 may convert and output the light output through the optical circulator 120 into a parallel beam. For example, the collimator 130 may receive the light output through the optical circulator 120, and convert and output the received light into the parallel beam through a lens included in the collimator 130.

The optical regulator 140 may reflect the light converted into the parallel beam through the collimator 130, and transfer the reflected light to the external apparatus 200. Specifically, the optical regulator 140 may reflect the light converted into the parallel beam, and transfer the reflected light to the beam separator 210 of the external apparatus 200.

Here, when the external apparatus 200 is described, the beam separator 210 may reflect a part of the transferred light and transfer the corresponding light to the reverse reflector 220, and pass the other part of the light which is not reflected, and transfer the corresponding light to the collimator 230 of the external apparatus 200. The collimator 230 of the external apparatus 200 may convert and output the transferred light into the parallel beam, and transfer the light to another external apparatus. In addition, the beam separator 210 may output the reflected light output through the reverse reflector 220 to the optical regulator 140. The reverse reflector 220 may reversely reflect the light reflected by the beam separator 210, and output the reflected light.

When the wireless optical communication based apparatus 100 is described again, the optical regulator 140 may receive the reflected light from the external apparatus 200. Therefore, the wireless optical communication based apparatus 100 receives the reflected light output through the reverser reflector 220 of the external apparatus 200 through the optical regulator 140, to determine the intensity of the light received from the external apparatus 200 in real time.

The optical detector 150 converts the reflected light into an electric signal. Specifically, the optical detector 150 converts the intensity of the reflected light into the electric signal including the intensity of the reflected light.

The controller 160 may acquire the intensity of the reflected light by analyzing the electric signal, and calculate the central coordinate information of the external apparatus 200 based on an intensity value of the reflected light. Specifically, the central coordinate information may be expressed as a pole coordinate including the length information and the angle information. The pole coordinate may be a coordinate in which a position of a predetermined point is represented by a distance and a direction from an original point.

Meanwhile, referring to FIG. 2, the controller 160 of the wireless optical communication based apparatus 100 may determine the length information and the angle information included in the central coordinate information based on intensity values of a plurality of reflected light acquired by changing a reaching point 20 of the light by controlling the optical regulator 140. The reaching point 20 of the light may be present on a plane formed by an X axis and a Y axis. However, the reaching point 20 of the light is not limited thereto, but may be present in a space. In addition, an area of the light may have a predetermined size based on the reaching point 20 of the light due to a spread property of the light.

Meanwhile, the controller 160 may determine area information based on information on a position where the external apparatus 200 is present. Specifically, the controller 160 may acquire information on the position where the external apparatus 200 is present through a positional information sensor (not illustrated) included in the external apparatus 200. For example, the positional information sensor (not illustrated) may include at least one of a global positioning system (GPS) sensor, a wireless fidelity (Wi-Fi) sensor, or a global navigation satellite system (Glonass) sensor. However, the present disclosure is not limited thereto. The area information may include information on a predetermined area 10 formed based on the position where the external apparatus 200 is present. The area information may include at least one of central point information, preliminary length information, and preliminary angle information for determining the reaching point 20 of the light. The central point information may include information on a central point 11 of the area 10. The preliminary length information may include information on a preliminary length 12 from the central point 11. The preliminary angle information may include information on the preliminary angle 13 between the X axis and the preliminary length 12 based on the central point 11.

Meanwhile, the wireless optical communication based apparatus 100 may transfer the light in which the intensity of the light has the Gaussian distribution on a z axis (not illustrated) to the external apparatus 200. In addition, when the wireless optical communication based apparatus 100 receives the reflected light acquired by reversely reflecting the light from the external apparatus 200, the wireless optical communication based apparatus 100 may acquire the intensity of the reflected light. The intensity of the reflected light may be a portion overlapped with an area of a receiving unit of the light of the external apparatus 200. Here, the receiving unit of the light of the external apparatus 200 may include the beam separator 210. The intensity of the reflected light may be shown in Equation 1 below.

$$Y = \int_{A_r} I_r(r,z) r dr d\theta \quad \text{[Equation 1]}$$

Here, $I_r(r,z)$ presents a probability distribution function for the intensity of the light in a (r,z) coordinate of the wireless optical communication based apparatus 100, and $A_r$ means an area where the receiving unit of the light of the external apparatus 200 is present. When an intensity density function of the light in an area which reaches the receiving unit of the light of the external apparatus 200 in a cylindrical coordinate system is integrated, a total intensity of the received light is calculated.

In this case, $I_r(r,z)$ may be Equation 2 below when it is assumed that the intensity of the light has a 2D Gaussian distribution and passes through a channel, and white Gaussian noise is added.

$$I_r(r,z) = h \times I_t(r,z) + n \quad \text{[Equation 2]}$$

Here, h represents an intensity attenuation by a stand-by channel, and n means the white Gaussian noise.

A power distribution $I_t(r,z)$ of a 2D Gaussian intensity may be shown in Equation 3 below.

$$I_t(r,z) = \frac{2}{\pi w_z} \exp\left(-\frac{2(x^2+y^2)}{w_z^2}\right) \quad \text{[Equation 3]}$$

Here, when r=[x,y], the density distribution function of the intensity of the light may be known at a z position and a magnitude $w_z$ of the light at z may be shown in Equation 4 below.

$$w_z = w_0 \left[1 + \left(\frac{\lambda z}{\pi w_0^2}\right)^2\right]^{1/2} \quad \text{[Equation 4]}$$

Here, $w_0$ means the magnitude of the light at z=0 and $\lambda$ represents the wavelength of the beam.

The wireless optical communication based apparatus 100 may calculate the intensity of the light received by the external apparatus 200 through Equations 1, 2, 3, and 4.

As some exemplary embodiments in FIGS. 1 and 2, the wireless optical communication based apparatus 100 outputs the light and transfers the output light to the external apparatus 200, and receives the reflected light reversely reflected and output by the external apparatus 200 to determine the intensity of the light received by the external apparatus 200 in real time.

Meanwhile, a specific method in which the wireless optical communication based apparatus 100 calculates the central coordinate information of the external apparatus 200 will be described below with reference to FIGS. 3 to 8.

FIG. 3 is a flowchart for describing an example of the method for aligning a beam using the apparatus based on wireless optical communication according to some exemplary embodiments of the present disclosure.

Referring to FIG. 3, the wireless optical communication based apparatus 100 may output light by the light source 110 (S110).

Specifically, the wireless optical communication based apparatus 100 may output light having an infrared wavelength band through the light source 110. Therefore, the wireless optical communication based apparatus 100 outputs the light having the infrared wavelength band having a short wavelength, and as a result, distortion which is generated when the output light is reflected and returned by external apparatus 200 may be less generated than the distortion in other wavelength bands.

The wireless optical communication based apparatus 100 may output the light in at least one direction by the optical circulator 120 (S120).

Specifically, the wireless optical communication based apparatus 100 may convert and output at least one of the intensity of the light, a frequency, a phase, a polarization state, and a progress direction by using the optical circulator 120. For example, the wireless optical communication based apparatus 100 may output the light output by the light source 110 in the direction corresponding to the collimator 130 by using the optical circulator 120. As another example, the wireless optical communication based apparatus 100 may output the reflected light received from the external apparatus 200 in the direction corresponding to the optical detector 150 by using the optical circulator 120.

The wireless optical communication based apparatus 100 may convert and output the light into the parallel beam by the collimator 130 (S130).

Specifically, the wireless optical communication based apparatus 100 may refract or reflect the received light through the collimator 130 and allows the refracted or reflected light to pass through the lens, and convert and output the corresponding light into the parallel beam.

The wireless optical communication based apparatus 100 may reflect the light converted into the parallel beam by the optical regulator 140, and transfer the reflected light to the external apparatus 200, and receive the reflected light from the external apparatus 200 (S140).

Specifically, the wireless optical communication based apparatus 100 may reflect the light converted into the parallel beam by using the optical regulator 140, and transfer the reflected light to the beam separator 210 of the external apparatus 200. In addition, the wireless optical communication based apparatus 100 may receive the reflected light reflected by the beam separator 210 of the external apparatus 200 through the optical regulator 140 in real time.

The wireless optical communication based apparatus 100 converts the reflected light into the electric signal by the optical detector 150 (S150).

Specifically, the wireless optical communication based apparatus 100 converts the intensity of the reflected light into the electric signal by using the optical detector 150 including the intensity of the reflected light.

The wireless optical communication based apparatus 100 may acquire the intensity of the reflected light by analyzing the electric signal by the controller 160, and calculate the central coordinate information of the external apparatus 200 based on an intensity value of the reflected light (S160).

Specifically, the central coordinate information may be expressed as a pole coordinate including the length information and the angle information. The pole coordinate may be a coordinate in which a position of a predetermined point is represented by a distance and a direction from an original point.

Meanwhile, the wireless optical communication based apparatus 100 may determine the length information and the angle information included in the central coordinate information based on intensity values of a plurality of reflected light acquired by changing a reaching point 20 of the light by controlling the optical regulator 140 through the controller 160. The reaching point 20 of the light may be present on a plane formed by an X axis and a Y axis. However, the reaching point 20 of the light is not limited thereto, but may be present in a space. In addition, an area of the light may have a predetermined size based on the reaching point 20 of the light due to a spread property of the light.

Meanwhile, the method in which the wireless optical communication based apparatus 100 determines the angle information in the central coordinate information of the external apparatus 200 based on an intensity value of the reflected light will be described below in detail with reference to FIGS. 4 and 5.

FIG. 4 is a diagram for describing an example of a method for calculating angle information in central coordinate information of the external apparatus by using the apparatus based on wireless optical communication according to some exemplary embodiments of the present disclosure. FIG. 5 is a flowchart for describing an example of the method for calculating angle information in central coordinate information of the external apparatus by using the apparatus based on wireless optical communication according to some exemplary embodiments of the present disclosure.

Referring to FIGS. 4 and 5, the controller 160 may determine area information based on information on a position where the external apparatus 200 is present (S161).

Specifically, the controller 160 may acquire information on the position where the external apparatus 200 is present through a positional information sensor (not illustrated) included in the external apparatus 200. In addition, the area information may include information on a predetermined area 10 formed based on the position where the external apparatus 200 is present. The area information may include at least one of central point information and preliminary length information, for determining the reaching point 20 of the light. The central point information may include information on a central point 11 of the area 10. The preliminary length information may include information on a preliminary length 12 from the central point 11.

The controller 160 may change the reaching point 20 of the light by controlling the optical regulator 140 based on the area information (S162).

Specifically, the controller 160 may change the reaching point 20 of the light by controlling an angle or a position of the optical regulator 140 based on the area information. For example, the controller 160 may change the reaching point 20 of the light to a specific point by controlling the angle or the position of the optical regulator 140 within the area 10 based on the area information.

The controller 160 may acquire intensity values of a plurality of first reflected light in each of a plurality of first points 30 in conjunction with changing the reaching point of the light (S163).

Specifically, each of the plurality of first points 30 may be present on a trajectory 14 of a circle generated based on the central point information and the preliminary length information. Here, the central point information may include information on the center point of the circle. In addition, the preliminary length information may include information on a radius of the circle. For example, the center point of the circle may be a point where the X axis and the Y axis meet, and the radius of the circle may be a length which is present in the area 10 from the center point of the circle. That is, the controller 160 may acquire the intensity value of the plurality of first reflected light in each of the plurality of first points 30 which is present on the trajectory 14 of the circle.

For example, the controller 160 may control the optical regulator 140 to change the reaching point of the light along the trajectory 14 of the circle in which the radius is $R_{GPS}/2$ to an area of light having a radius of $R_{GPS}/2$ when the radius of the area 10 is $R_{GPS}$.

The controller 160 may determine, as the angle information, first angle coordinate information of a point having a largest intensity value among the intensity values of the plurality of first reflected light (S164).

For example, when the controller 160 controls the optical regulator 140 to change the reaching point of the light along the trajectory 14 of the circle in which the radius is $R_{GPS}/2$ to an area of light having a radius of GP when the radius of the area 10 is $R_{GPS}$, the intensity of the reflected light may be calculated by using Equations 5, 6, and 7 below.

$$\theta_{predict} = \tan^{-1}(a/b) \quad \text{[Equation 5]}$$

$$a = \frac{\sum_{i=0}^{n-1} \cos\theta_i \times Y_{\theta_i}}{\sum_{i=0}^{n-1} Y_{\theta_i}} \quad \text{[Equation 6]}$$

$$b = \frac{\sum_{i=0}^{n-1} \sin\theta_i \times Y_{\theta_i}}{\sum_{i=0}^{n-1} Y_{\theta_i}} \quad \text{[Equation 7]}$$

Here, $$\theta_i = 2\pi \frac{i-1}{n}$$

may be established within a range of i=1, 2, ..., n. $Y_{\theta_i}$ may be a result acquired by calculating the intensity of the reflected light at an angle of $\theta_i$ through Equation 1. Equations 6 and 7 may be derived from a method for predicting a mean of 1D Gaussian data. The intensity of the reflected light may be acquired on an X-axis direction and a Y-axis direction in Equations 6 and 7, respectively, and angle coordinate information $\theta_{predict}$ of the external apparatus 200 may be calculated by using Equation 5. As such, the controller 160 may calculate first angle coordinate information of a point having a largest intensity value among the intensity values of the plurality of first reflected light.

As in some exemplary embodiments described in FIGS. 4 and 5, the controller 160 of the wireless optical communication based apparatus 100 may first determine the first angle coordinate information of the point having the largest intensity value among the intensity values of the plurality of first reflected light.

Meanwhile, the method in which the wireless optical communication based apparatus 100 determines the length information in the central coordinate information of the external apparatus 200 based on the determined angle information will be described below in detail with reference to FIGS. 6 and 7.

FIG. 6 is a diagram for describing an example of a method for calculating length information in central coordinate information of the external apparatus by using the apparatus based on wireless optical communication according to some exemplary embodiments of the present disclosure. FIG. 7 is a flowchart for describing an example of the method for calculating length information in central coordinate information of the external apparatus by using the apparatus based on wireless optical communication according to some exemplary embodiments of the present disclosure.

Referring to FIGS. 6 and 7, the controller 160 of the wireless optical communication based apparatus 100 may control the optical regulator 140 so that light reaches each of a plurality of second points 40 when the angle information is determined (S165).

The controller 160 may acquire intensity values of a plurality of second reflected light in each of a plurality of second points 40 in conjunction with changing the reaching point 20 of the light (S166).

Specifically, each of the plurality of second points may be present on a trajectory 15 of a straight line generated based on first angle coordinate information. That is, the controller 160 may acquire the intensity values of the plurality of second reflected light in each of the plurality of second points 40 which is present on the trajectory 15 of the straight line in conjunction with changing the reaching point 20 of the light.

The controller 160 may determine, as the length information, a length value of a point having a largest intensity value among the intensity values of the plurality of second reflected light (S167).

For example, in the controller 160, when the plurality of second points 40 is generated while varying a distance $r_j$ in a straight-line direction on the trajectory 15 of the straight line in which the reaching point 20 of the light has an angle of $\theta_{predict}$, the length value may be calculated by using Equation 8 below.

$$r_{predict} = \frac{\sum_{j=0}^{n-1} r_j \times Y_{r_j}}{\sum_{j=0}^{n-1} Y_{r_j}}$$ [Equation 8]

Here, $$r_j = \left(\frac{2j-n-2}{n}\right)R$$

may be established within a range of j=1, 2, ..., n. $Y_{r_j}$ may be a result acquired by calculating the intensity of the reflected light at a position of $r_j$ through Equation 1. Accordingly, the controller 160 calculates the length value of the point having the largest intensity value among the intensity values of the plurality of second reflected light, and determines the calculated length value as the length information to calculate the central coordinate information of the external apparatus 200. For example, the controller 160 may express the central coordinate information as pole coordinates ($r_{predict}, \theta_{predict}$).

The controller 160 may adjust the light source 110, the optical circulator 120, the collimator 130, and the optical regulator 140 so as to output the light to the external apparatus 200 based on the calculated central coordinate information. Further, the controller 160 may control the light output by the light source 110 by considering a prediction error. For example, the controller 160 may control the light source 110 so that an area of light having a predetermined size is formed to be larger than the beam separator 210 of the external apparatus 200 based on the reaching point 20 of the light.

As in some exemplary embodiments described in FIGS. 6 and 7, the controller 160 of the wireless optical communication based apparatus 100 calculates the intensity values of the plurality of second reflected light in each of the plurality of second points based on the determined angle information, and determines the length value of the point having the largest intensity value among the intensity values of the plurality of second reflected light as the length information to calculate the central coordinate information of the external apparatus 200.

As in some exemplary embodiments described in FIGS. 1 to 7, the wireless optical communication based apparatus 100 may first determine the angle information based on the intensity value of the reflected light, and simplify a process required for beam alignment through a method for determining the length information later based on the angle information. Further, the wireless optical communication based apparatus 100 calculates the intensity of the light by using that the intensity of the light has a Gaussian intensity distribution to predict the position of the external apparatus 200 without curve fitting even when there is an influence of a channel and noise. In addition, the wireless optical communication based apparatus 100 may be utilized in an actual wireless optical communication based backhaul system by considering characteristics of the light.

Meanwhile, in FIGS. 1 to 7, an exemplary embodiment of calculating the central coordinate information of the external apparatus 200 by using the wireless optical communication based apparatus 100 will be described below.

As the exemplary embodiment of the present disclosure, a log-normal channel model representatively adopted is applied when analyzing a performance of wireless optical communication, and a simulation is performed for a case where there is white Gaussian noise by using the wireless optical communication based apparatus 100.

First, a probability density function $f_h(h)$ for a channel h of the log-normal channel model may be calculated by using Equation 9 below.

$$f_h(h) = \frac{1}{h\sigma_{l,h}\sqrt{2\pi}} \exp\left(-\frac{(\ln(h) - \mu_{l,h})^2}{2\sigma_{l,h}^2}\right) \quad \text{[Equation 9]}$$

Here, for normalization to $E[h]=1$, $\mu_{l,h}^2 = -\sigma_{l,h}^2/2$, $\sigma_{l,h}^2 \simeq \sigma_R^2/4$ is defined, and in this case, $\sigma_R^2$ is a variable measured according to a stand-by environment called Rytov variance.

In the exemplary embodiment, a value of $\sigma_R^2 = 0.3$ is set. Further, white Gaussian noise n has a Gaussian distribution in which a mean is 0 and a distribution is $N_0/2$. In particular, $N_0 = 1/SNR$ may be calculated by normalizing the intensity of the light to 1. h and n defined above are substituted into Equation 2. Specific variable set values are shown in Table 1 below.

TABLE 1

| Variable | Value |
| --- | --- |
| n | 10, 20, 30, 40, 50, 60, 70 |
| $\sigma_R^2$ | 0.3 |
| Signal-to-noise ratio (SNR) (dB) | 3, 8, 13, 18, 23, 28 |
| Number of times for mean calculation | 10000 |
| Radius of area obtained by GPS, $R_{GPS}$ | 1 m |
| Radius of lens of receiver, $R_{receiver}$ | 0.3 m |
| Beam size in receiver, $w_z$ | 0.5 $R_{GPS}$ |

An exemplary embodiment to be described below is a simulation result in which n is 60 and the SNR is 28 dB among all exemplary embodiments.

First, the intensity value of the first reflected light according to the first angle of the reaching point of the light using the wireless optical communication based apparatus 100 is measured. FIG. 8 is a diagram illustrating an intensity value of first reflection light according to a first angle of a reaching point of light measured through the apparatus based on wireless optical communication according to some exemplary embodiments of the present disclosure.

Referring to FIG. 8, it may be identified that the reaching point of the light using the wireless optical communication based apparatus 100 has a highest value between 0 to 30 degrees, and first angle coordinate information having a highest value is determined the angle information.

Next, the intensity value of the second reflected light according to the length at the center point of the circle is measured based on the angle information determined through the wireless optical communication based apparatus 100. FIG. 9 is a diagram illustrating an intensity value of second reflection light according to a length at a center point of a circle measured through the apparatus based on wireless optical communication according to some exemplary embodiments of the present disclosure.

Referring to FIG. 9, it may be identified that the intensity value of the second reflected light using the wireless optical communication based apparatus 100 has a highest intensity value around 0.5 m, and the length value at the center point of the circle having the highest value is determined as the length information.

The central coordinate calculated through the wireless optical communication based apparatus 100 and the actual central coordinate are compared. FIG. 10 is a diagram illustrating a central coordinate of the external apparatus and an actual central coordinate of the external apparatus calculated through the apparatus based on wireless optical communication according to some exemplary embodiments of the present disclosure.

Referring to FIG. 10, it can be seen that a distance difference between a central coordinate 201 of the external apparatus 200 calculated through the wireless optical communication based apparatus and an actual central coordinate 202 of the external apparatus 200 is generated within an error range.

Next, a simulation result for all exemplary embodiments through the wireless optical communication based apparatus 100 is described. FIG. 11 is a diagram illustrating an average distance difference according to a signal-to-noise ratio measured for each value of white Gaussian noise through the apparatus based on wireless optical communication according to some exemplary embodiments of the present disclosure.

Referring to FIG. 11, as the simulation result through the wireless optical communication based apparatus 100, it can be seen that excellent performance is obtained as the white Gaussian noise 1 increases. Further, since the wireless optical communication based apparatus 100 does not show a large difference in performance when n exceeds 50, it can be seen that selecting 50 as n is reasonable.

As in some exemplary embodiments described in FIGS. 1 to 11, in the wireless optical communication based apparatus 100, a calculation amount of 2n is required in the processes of Equation 5 and Equation 8 for calculating the central coordinate information of the external apparatus 200, and this may have very low complexity. In the existing apparatus, when actual noise is added, just finding a point where the intensity of the received light is the largest causes a large error. In order to prevent this, the existing apparatus finds a maximum value by curve fitting, but this increases calculation complexity to lower the performance. However, the wireless optical communication based apparatus 100 according to the present disclosure may calculate the central coordinate information of the external apparatus 200 with low complexity even when the channel and the noise are added.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. An apparatus based on wireless optical communication, comprising:
  a light source outputting light;
  an optical circulator outputting the light in at least one direction;
  a collimator converting and outputting the light output through the optical circulator into a parallel beam;

an optical regulator reflecting the light converted into the parallel beam, and transferring the reflected light to an external apparatus, and receiving the reflected light from the external apparatus, the reflected light being light output by reversely reflecting the light by the external apparatus;

an optical detector converting the reflected light into an electric signal; and a controller analyzing the electric signal and acquiring an intensity of the reflected light, and calculating central coordinate information of the external apparatus based on the intensity value of the reflected light, wherein the central coordinate information is expressed as a pole coordinate including length information and angle information, wherein the controller determines the length information and the angle information included in the central coordinate information based on intensity values of a plurality of reflected light acquired by changing a reaching point of the light by controlling the optical regulator, and wherein the controller determines area information based on information on a position where the external apparatus is present, changes the reaching point of the light by controlling the optical regulator based on the area information, acquires intensity values of a plurality of first reflected light in each of a plurality of first points in conjunction with changing the reaching point of the light, and determines, as the angle information, first angle coordinate information of a point having a largest intensity value among the intensity values of the plurality of first reflected light.

2. The apparatus of claim 1, wherein the area information includes at least one of central point information and preliminary length information, for determining the reaching point of the light.

3. The apparatus of claim 2, wherein each of the plurality of first points is present on a trajectory of a circle generated based on the central point information and the preliminary length information.

4. The apparatus of claim 3, wherein the central point information includes information on the center point of the circle, and the preliminary length information includes information on a radius of the circle.

5. The apparatus of claim 1, wherein the controller controls the optical regulator so that the light reaches each of a plurality of second points when the angle information is determined, acquires intensity values of a plurality of second reflected light in each of the plurality of second points in conjunction with changing the reaching point of the light, and determines, as the length information, a length value of a point having a largest intensity value among the intensity values of the plurality of second reflected light.

6. The apparatus of claim 5, wherein each of the plurality of second points is present on a trajectory of a straight line generated based on the first angle coordinate information.

7. The apparatus of claim 1, wherein the external apparatus includes a beam separator reflecting the light and transferring the reflected light to the optical regulator, and a reverse reflector outputting the reflected light by reversely reflecting the light reflected by the beam separator.

8. A method for aligning a beam using a wireless optical communication based apparatus, the method comprising:

outputting, by a light source, light;

outputting, by an optical circulator, the light in at least one direction;

converting and outputting, by a collimator, the light output through the optical circulator into a parallel beam;

reflecting, by an optical regulator, the light converted into the parallel beam, and transferring the reflected light to an external apparatus, and receiving the reflected light from the external apparatus, the reflected light being light output by reversely reflecting the light by the external apparatus;

converting, by an optical detector, the reflected light into an electric signal; and analyzing, by a controller, the electric signal and acquiring an intensity of the reflected light, and calculating central coordinate information of the external apparatus based on the intensity value of the reflected light, wherein the central coordinate information is expressed as a pole coordinate including length information and angle information, wherein the controller determines the length information and the angle information included in the central coordinate information based on intensity values of a plurality of reflected light acquired by changing a reaching point of the light by controlling the optical regulator, and wherein the controller determines area information based on information on a position where the external apparatus is present, changes the reaching point of the light by controlling the optical regulator based on the area information, acquires intensity values of a plurality of first reflected light in each of a plurality of first points in conjunction with changing the reaching point of the light, and determines, as the angle information, first angle coordinate information of a point having a largest intensity value among the intensity values of the plurality of first reflected light.

* * * * *